United States Patent
Kaita et al.

(10) Patent No.: US 9,166,515 B2
(45) Date of Patent: Oct. 20, 2015

(54) ELECTRICALLY POWERED VEHICLE AND METHOD FOR CONTROLLING THE SAME

(75) Inventors: Keiji Kaita, Miyoshi (JP); Teruo Ishishita, Miyoshi (JP); Yuji Nishi, Nagoya (JP); Masaru Takagi, Toyota (JP); Masaki Okamura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/885,852

(22) PCT Filed: Dec. 20, 2010

(86) PCT No.: PCT/JP2010/072861
§ 371 (c)(1),
(2), (4) Date: May 16, 2013

(87) PCT Pub. No.: WO2012/085992
PCT Pub. Date: Jun. 28, 2012

(65) Prior Publication Data
US 2013/0264975 A1 Oct. 10, 2013

(51) Int. Cl.
*H02P 1/00* (2006.01)
*H02P 27/06* (2006.01)
*B60L 11/18* (2006.01)
*B60L 15/20* (2006.01)

(52) U.S. Cl.
CPC .............. *H02P 27/06* (2013.01); *B60L 11/1803* (2013.01); *B60L 11/1853* (2013.01); *B60L 11/1861* (2013.01); *B60L 11/1868* (2013.01); *B60L 15/2009* (2013.01); *B60L 2210/10* (2013.01); *B60L 2220/14* (2013.01); *B60L 2240/12* (2013.01); *B60L 2240/423* (2013.01); *B60L 2240/545* (2013.01); *B60L 2240/547* (2013.01); *B60L 2240/549* (2013.01); *Y02T 10/642* (2013.01); *Y02T 10/7005* (2013.01); *Y02T 10/7044* (2013.01); *Y02T 10/7066* (2013.01); *Y02T 10/7077* (2013.01); *Y02T 10/7216* (2013.01); *Y02T 10/7275* (2013.01)

(58) Field of Classification Search
CPC . Y02T 10/7005; Y02T 10/7077; Y02T 10/70; B60W 10/08; B60W 20/00
USPC .......................................... 318/139; 320/104
See application file for complete search history.

(56) References Cited

U.S. PATENT DOCUMENTS

| | | | |
|---|---|---|---|
| 7,419,020 B2 * | 9/2008 | Pott et al. ..................... | 180/65.1 |
| 2008/0197810 A1 | 8/2008 | Ishikawa et al. | |
| 2009/0160249 A1 | 6/2009 | Soma et al. | |
| 2009/0167216 A1 | 7/2009 | Soma et al. | |
| 2009/0230901 A1 * | 9/2009 | Amano ........................ | 318/400.3 |
| 2009/0243522 A1 * | 10/2009 | Suhama et al. ............... | 318/376 |

(Continued)

FOREIGN PATENT DOCUMENTS

| | | | |
|---|---|---|---|
| JP | 2007-089262 A | 4/2007 | |
| JP | A-2008-17574 | 1/2008 | |
| JP | 2009-225587 A | 10/2009 | |
| JP | A-2010-104096 | 5/2010 | |
| JP | A-2010-110124 | 5/2010 | |

(Continued)

*Primary Examiner* — Shawki S Ismail
*Assistant Examiner* — Bradley Brown
(74) *Attorney, Agent, or Firm* — Oliff PLC

(57) ABSTRACT

A converter is disposed between a first battery and a power line for transmitting power inputted to and outputted from a motor for traveling. A second battery, on the other hand, is connected to the power line with a relay being interposed therebetween. A control unit controls the relay to be turned on or off in accordance with an operating state of the motor.

13 Claims, 4 Drawing Sheets

(56) References Cited

U.S. PATENT DOCUMENTS

2009/0261658 A1* 10/2009 Kato .................. 307/82
2010/0100264 A1  4/2010 Kato
2011/0187184 A1  8/2011 Ichikawa
2012/0248869 A1  10/2012 Itagaki et al.

FOREIGN PATENT DOCUMENTS

| JP | A-2010-166790 | | 7/2010 | |
| JP | WO2010/095641 | * | 8/2010 | .......... 320/166 |
| JP | A-2011-101481 | | 5/2011 | |
| WO | 2007/102450 A1 | | 9/2007 | |

* cited by examiner

|  | BATTERY 120 IS USED | BATTERY 120 IS NOT USED |
|---|---|---|
| Wout | Wout1−(L1+Lc)+Wout2−L2 | Wout1−(L1+Lc) |
| Win | Win1+(L1+Lc)+Win2+L2 | Win1+(L1+Lc) |

ELECTRICALLY POWERED VEHICLE AND METHOD FOR CONTROLLING THE SAME

TECHNICAL FIELD

This invention relates to an electrically powered vehicle and a method for controlling the same, and more particularly to control of an electrically powered vehicle mounted with a plurality of power storage devices.

BACKGROUND ART

Electrically powered vehicles, such as hybrid vehicles, electric vehicles, etc., are each mounted with a power storage device (representatively, a secondary battery) for storing power inputted to and outputted from a traction motor.

Japanese Patent Laying-Open No. 2010-166790 (PTD1) describes a configuration wherein a plurality of high-voltage batteries are connected in parallel, allowing power to be supplied to a boost converter serving as an on-board power converter circuit. With the configuration described in PTD1, the boost converter enables variable control of DC-side voltage of an inverter, i.e., amplitude of pulse voltage applied to the motor for traveling.

As another example in which a plurality of power storage devices are connected, Japanese Patent Laying-Open No. 2010-110124 (PTD2) discloses a power supply system mounted with a main secondary battery block and an auxiliary secondary battery block. The power supply system disclosed in PTD2 is provided with a DC-DC converter for converting output voltage of the auxiliary secondary battery block. PTD2 also describes that the DC-DC converter up-converts voltage from the auxiliary secondary battery block during discharge for supply of power to a load, and down-converts voltage from the main secondary battery block during charge for supply of power to the auxiliary secondary battery block.

CITATION LIST

Patent Document

PTD 1: Japanese Patent Laying-Open No. 2010-166790
PTD 2: Japanese Patent Laying-Open No. 2010-110124

SUMMARY OF INVENTION

Technical Problem

In the configuration described in PTD1, relays are disposed such that two high-voltage batteries can be connected each independently with the boost converter, or connected in parallel with the boost converter. However, power loss in the boost converter is produced at the time of charge or discharge of either of the high-voltage batteries. Moreover, because of the configuration wherein the high-voltage batteries are directly connected with each other in parallel on a low-voltage side of the boost converter, it is difficult to use the two high-voltage batteries in parallel unless their battery voltage level is the same.

On the other hand, in the power supply system described in PTD2, the DC-DC converter is disposed only for the auxiliary secondary battery block. Then, output voltage of the auxiliary secondary battery block is boosted by the DC-DC converter to be equal to that of the main secondary battery block, so that the auxiliary secondary battery block and the main secondary battery operate in parallel, causing charge/discharge from/to the load.

In the configuration in PTD2, however, the main secondary battery block is always connected to the load. DC voltage to be supplied to the load, therefore, is at a constant level. In other words, when the configuration described in PTD2 is applied to the on-board power supply apparatus as described in PTD1, DC-side voltage of the inverter cannot be variably controlled.

In order to achieve variable control of the voltage to be supplied to the load in PTD2, it is necessary to dispose an additional DC-DC converter also between the main secondary battery block and the load. Such a configuration, however, will cause increase in the size and costs of the power supply system.

This invention was made to solve the problems as described above, and an object of this invention is to simply and efficiently configure a power supply system for an electrically powered vehicle mounted with a plurality of power storage devices while ensuring a function of variable control of DC voltage.

Solution to Problem

According to one aspect of this invention, an electrically powered vehicle includes a motor for generating vehicle driving force, a first power storage device, a second power storage device, a power line for transmitting power inputted to and outputted from the motor, a converter, a switch, and a control unit. The converter is configured to carry out bidirectional DC voltage conversion between the first power storage device and the power line. The switch is connected between the second power storage device and the power line. The control unit controls the switch to be turned on or off in accordance with an operating state of the motor.

Another aspect of this invention is directed to a method for controlling an electrically powered vehicle. The electrically powered vehicle is mounted with a motor for generating vehicle driving force, a first power storage device, a second power storage device, and a converter for carrying out bidirectional DC voltage conversion between the first power storage device and a power line for transmitting power inputted to and outputted from the motor. The controlling method includes the steps of detecting an output voltage of the second power storage device, and controlling the switch connected between the second power storage device and the power line to be turned on or off in accordance with an operating state of the motor.

Preferably, the control unit calculates a minimum required voltage of the power line in accordance with a torque and a rotation speed of the motor. The switch is turned off when the output voltage of the second power storage device is lower than the minimum required voltage.

More preferably, the control unit sets a voltage command value of the power line in a range not lower than the minimum required voltage in accordance with the torque and the rotation speed of the motor. The switch is turned on when the output voltage of the second power storage device is higher than the voltage command value, while it is turned off when the output voltage is lower than the voltage command value.

More preferably, the switch is turned off when a voltage difference obtained by subtracting the voltage command value from the output voltage of the second power storage device is greater than a predetermined threshold value.

Further, preferably, the switch is turned off when a charge level of the second power storage device becomes lower than a predetermined value.

Preferably, when the switch is turned off, charge and discharge power upper limit values in the entire first and second power storage devices are set based on charge and discharge power upper limit values of the first power storage device and a loss power value in the converter, and when the switch is turned on, the charge and discharge power upper limit values are set based on the charge and discharge power upper limit values of the first power storage device, charge and discharge power upper limit values of the second power storage device, and the loss power value in the converter.

Further, preferably, a rated value of the output voltage of the first power storage device is lower than a rated value of the output voltage of the second power storage device.

Alternatively, preferably, the first power storage device has a power density higher than that of the second power storage device, and has an energy density lower than that of the second power storage device.

Advantageous Effects of Invention

According to this invention, a power supply system for an electrically powered vehicle mounted with a plurality of power storage devices can be configured simply and efficiently while ensuring a function of variable control of DC voltage.

DESCRIPTION OF EMBODIMENTS

Figure 1:
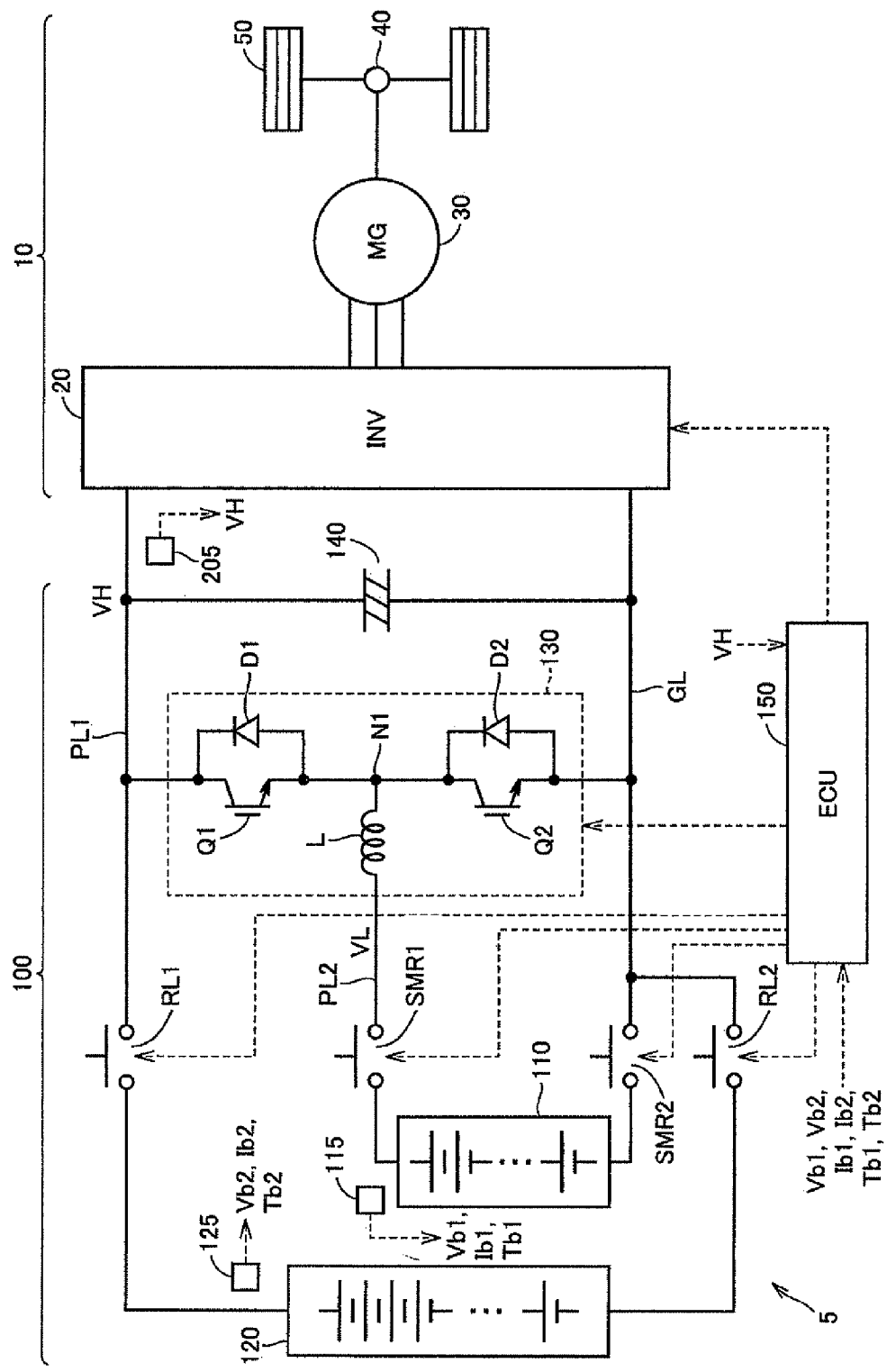
FIG. 1 is a block diagram for explaining a configuration of an electrically powered vehicle according to an embodiment of the present invention.

Embodiments of the present invention will be described in detail below, referring to the drawings. It is noted that identical or corresponding parts in the drawings will be denoted below by identical reference characters, and description thereof will not be repeated in principle.

FIG. 1 is a block diagram for explaining a configuration of an electrically powered vehicle according to an embodiment of the present invention.

Referring to FIG. 1, an electrically powered vehicle 5 according to the embodiment of the present invention includes a load 10, a power supply system 100, and a control unit 150. Load 10 includes an inverter 20, a motor generator 30, a power transmission gear 40, and a driving wheel 50.

Motor generator 30 is representatively constituted of a three-phase permanent magnet synchronous motor. Output torque of motor generator 30 is transmitted to the driving wheel via power transmission gear 40, which is constituted of a reduction gear and a power-split mechanism (not illustrated), causing electrically powered vehicle 5 to travel. In other words, motor generator 30 corresponds to a "motor" for generating vehicle driving force.

Motor generator 30 is capable of generating power by rotational force of driving wheel 50 during regenerative braking operation of electrically powered vehicle 5. The generated power is then converted by inverter 20 to DC power for charging a power storage device 110 and/or 120 in power supply system 100.

Inverter 20 is constituted of a general three-phase inverter as described also in PTD1. Inverter 20 converts DC voltage on a power line PL1 to AC voltage and applies the AC voltage to each phase of motor generator 30. In other words, inverter 20 carries out bidirectional DC/AC conversion between the DC power on power line PL1 and AC power for controlling and driving motor generator 30. Power line PL1 corresponds to a "first power line" for transmitting power inputted to and outputted from motor generator 30.

Control unit 150 is constituted of an electronic control unit (ECU) incorporating a CPU (Central Processing Unit) and a memory (not illustrated). The ECU is configured to perform operation processing using detection values from various sensors, based on a map and a program stored in the memory. Alternatively, at least a portion of the ECU may be configured to perform predetermined numerical/logical operation processing using hardware such as an electronic circuit or the like.

Power supply system 100 includes power storage device 110 corresponding to a "first power storage device", power storage device 120 corresponding to a "second power storage device", system main relays SMR1, SMR2, relays RL1, RL2, a converter 130, and a smoothing capacitor 140.

Each of power storage devices 110, 120 is representatively constituted of a secondary battery such as a lithium-ion battery, a nickel-metal hydride battery, or the like. Thus, power storage device 110 and power storage device 120 will also hereinafter be referred to as battery 110 and battery 120, respectively. Each of power storage devices 110, 120, however, can also be constituted of other power storage elements such as an electric double layer or the like, or a combination of another power storage element and a battery.

Each of power storage devices 110 and 120 may also be constituted of the same type of power storage device or a different type of power storage device. A preferred example where power storage devices 110 and 120 are constituted of different types of power storage devices will be described in detail later.

Each of batteries 110 and 120 is constituted of battery cells connected in series. In other words, a rated value of output voltage of each of batteries 110 and 120 depends on the number of battery cells connected in series.

Battery 110 is provided with a battery sensor 115 for detecting a battery voltage Vb1, a battery current Ib1, and a battery temperature Tb1. Similarly, battery 120 is provided with a battery sensor 125 for detecting a battery voltage Vb2, a battery current Ib2, and a battery temperature Tb2. Detection values from battery sensors 115, 125 are transmitted to control unit 150.

System main relay SMR1 is electrically connected between a positive electrode terminal of battery 110 and a power line PL2. System main relay SMR2 is electrically connected between a negative electrode terminal of battery 110 and a power line GL. Power lines PL1, PL2 transmit DC voltage. Power line GL corresponds to a ground line.

Relay RL1 is electrically connected between a positive electrode terminal of battery 120 and power line PL1. Relay RL2 is electrically connected between a negative electrode terminal of battery 120 and power line GL. Relay RL1 corresponds to a "switch."

It is noted that relay RL2 needs not be disposed if the negative electrode terminal of battery 120 and the negative electrode terminal of battery 110 are electrically connected with each other. In this way, the number of relays can be reduced, thereby achieving reduction in size and costs. On the other hand, when relay RL2 is disposed as in the configuration in FIG. 1, battery 110 can be completely electrically disconnected from the power supply system, thus achieving a configuration preferred in terms of safety.

System main relays SMR1, SMR2 and relays RL1, RL2 are controlled to be turned on (closed) or off (opened) by control unit 150.

It is noted that each of the relays shown in the present embodiment is representatively constituted of an electromagnetic relay that is closed (turned on) by connecting contacts to each other when electric current is being passed, and is opened (turned off) by disconnecting the contacts from each other when electric current is not being passed. Any switch such as a semiconductor relay can be used, however, as long as it has a configuration capable of controlling the closing (on) and opening (off).

Converter 130 is configured to carry out bidirectional DC voltage conversion between power line PL1 and battery 110. For example, in the configuration example in FIG. 1, converter 130 has a configuration of a non-insulating type chopper circuit.

Specifically, converter 130 includes power semiconductor switching elements Q1, Q2 and a reactor L. In the present embodiment, IGBTs (Insulated Gate Bipolar Transistors) are shown as exemplary power semiconductor switching elements (hereinafter also simply referred to as "switching elements"). However, any elements capable of on/off control, such as power MOS (Metal Oxide Semiconductor) transistors, power bipolar transistors, or the like, can be used as the switching elements. Anti-parallel diodes D1, D2 are disposed for switching elements Q1, Q2, respectively.

Reactor L is connected between power line PL2 and a node N1. Switching element Q1 is connected between power line PL1 and node N1. Switching element Q2 is connected between node N1 and power line (ground line) GL. Switching elements Q1, Q2 are controlled to be turned on or off by a control signal from control unit 150.

Smoothing capacitor 140 is connected between power line PL1 and power line GL. A voltage sensor 205 detects DC voltage VH on power line PL1. A detection value from voltage sensor 205 is transmitted to control unit 150. DC voltage VH corresponding to the DC-side voltage of inverter 20 will also hereinafter be referred to as system voltage VH.

Converter 130 controls a voltage conversion ratio (VH/Vb) between a DC voltage VL on power line PL2 and system voltage VH on power line PL1, by way of the on/off control of switching element(s) Q1 and/or Q2. Specifically, a duty ratio of each of switching elements Q1 and Q2 is controlled such that system voltage VH matches a voltage command value VHr. When it is unnecessary to boost system voltage VH from DC voltage VL, VH=VL (voltage conversion ratio=1.0) can also be set by fixing switching elements Q1 and Q2 to on and off, respectively.

Basically, in converter 130, switching elements Q1 and Q2 are controlled to be turned on or off in a complementary and alternate manner within each switching cycle. In this way, system voltage VH can be controlled to voltage command value VHr, in accordance with any of charge and discharge of battery 110, without switching of control operation in accordance with a direction of current, in particular.

Control unit 150 receives detection values (Vb1, Ib1, Tb1, Vb2, Ib2, Tb2) from battery sensors 115, 125, and a detection value (VH) from voltage sensor 205. Further, in order to appropriately operate power supply system 100, control unit 150 generates a signal for controlling on and off of each of system main relays SMR1, SMR2 and relays RL1, RL2, and a control signal for converter 130, based on an operating state of motor generator 30 and the detection values from the various sensors. Control processing by control unit 150 will be described in greater detail later.

As described above, in electrically powered vehicle 5 according to the embodiment of the present invention, power supply system 100 is configured to include a plurality of batteries 110 and 120. Battery 120 is directly electrically connected to power line PL1, without a converter being interposed therebetween. Therefore, when relays RL1, RL2 are turned on, system voltage VH cannot be increased over battery voltage Vb2.

Battery 110, on the other hand, is connected to power line PL1 with converter 130 being interposed therebetween. Therefore, even with battery voltage Vb1 being lower than system voltage VH, power can be supplied to power line PL1 from battery 110, and battery 110 can be charged with power on power line PL1.

Thus, the rated value of the output voltage of battery 110 is preferably set to be lower than that of the output voltage of battery 120. In this way, batteries 110 and 120 can be used in parallel, even when the number of battery cells connected in series in battery 110 is reduced.

Next, a relation between the operating state of motor generator 30 and system voltage VH will be described in detail.

In order to smoothly drive motor generator 30, system voltage VH needs to be appropriately set in accordance with an operating point of motor generator 30, specifically, in accordance with a rotational speed and a torque. First, since inverter 20 has a certain limitation on a modulation factor of DC/AC conversion, an upper limit torque that can be outputted exists for system voltage VH.

Figure 2:
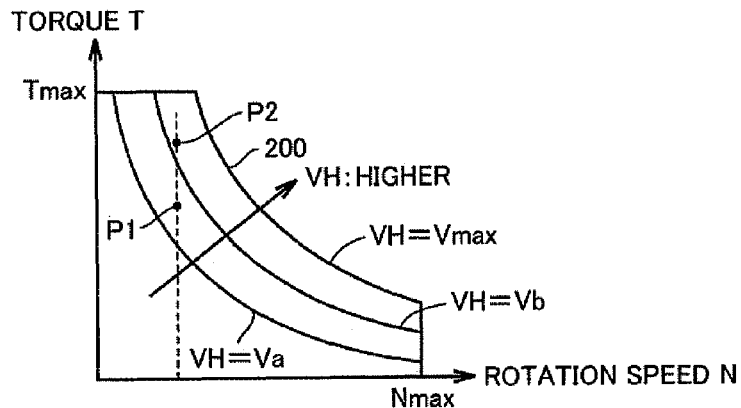
FIG. 2 is a conceptual diagram showing a relation between system voltage and an operable region of a motor generator.

FIG. 2 is a conceptual diagram showing a relation between the system voltage and an operable region of the motor generator.

Referring to FIG. 2, an operating region and an operating point of motor generator 30 are shown by a combination of the rotation speed and torque. A maximum output line 200 represents a limit for the operable region when system voltage VH=Vmax (upper limit voltage). Maximum output line 200 has a portion restricted by T×N, which corresponds to output power, even when torque T<Tmax (maximum torque) and the rotation speed N<Nmax (the maximum rotation speed). As system voltage VH lowers, the operable region becomes narrower.

For example, an operating point P1 can be achieved when system voltage VH=Va. When electrically powered vehicle 5 is accelerated from this state by operation of the accelerator by a user, a requested value for vehicle driving force increases. This increases the output torque of motor generator 30, thus changing the operating point to P2. Operating point P2, however, cannot be attained unless system voltage VH is increased to Vb (Vb>Va).

A lower limit value (minimum required voltage VHmin) of system voltage VH at each operating point (rotational speed, torque) of motor generator 30 can be found based on the relation between system voltage VH and boundaries of operating regions shown in FIG. 2.

Moreover, induced voltage proportionate to the rotation speed is generated in motor generator 30. If this induced voltage becomes higher than system voltage VH, current in motor generator 30 will be out of control. Thus, while electrically powered vehicle 5 is traveling at high speed with an increased rotation speed of motor generator 30, minimum required voltage VHmin of system voltage VH increases.

From these standpoints, it is understood that it is possible to calculate in advance, in correspondence with an operating point of motor generator 30, minimum required voltage VHmin for ensuring an output in accordance with the operating point.

Figure 3:
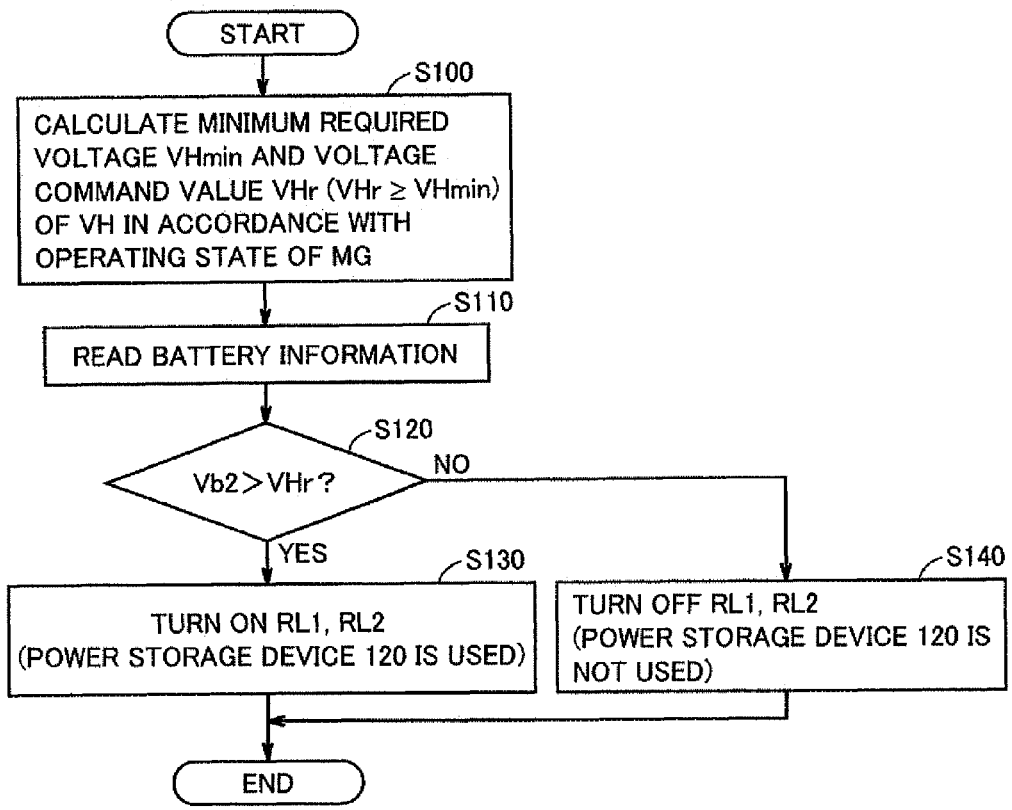
FIG. 3 is a flowchart for explaining a first example of control processing in a power supply system of the electrically powered vehicle according to the embodiment of the present invention.

FIG. 3 is a flowchart for explaining a first example of control processing in the power supply system of the electrically powered vehicle according to an embodiment of the present invention. In FIG. 3 and other figures, processing at each step in each of the flowcharts shown below is carried out by software processing or hardware processing performed by control unit 150. Further, a series of control processing operations according to each of the flowcharts shown below is carried out by control unit 150 at every predetermined control cycle.

Referring to FIG. 3, at step S100, control unit 150 calculates minimum required voltage VHmin based on an operating state of motor generator 30, using the above-described map of required voltages. Then at step 110, voltage command value VHr is set in consideration of minimum required voltage VHmin.

Voltage command value VHr is set to VHr=VHmin or VHr>VHmin. For example, when there is a voltage at which loss in power supply system 100 and load 10 is minimum in the region of VH>VHmin, rather than when VH=VHmin, it is preferred that voltage command value VHr be set to that voltage, in favor of fuel efficiency. On the other hand, when it is desirable to actively use battery 120, voltage command value VHr is preferably lower, and thus, may be set to VHr=VHmin.

Accordingly, voltage command value VHr can be calculated in correspondence with an operating point of motor generator 30, in consideration of minimum required voltage VHmin. For this reason, a map (voltage command value map) for calculating, in correspondence with an operating point of motor generator 30, voltage command value VHr in accordance with the operating point, can be created in advance. The voltage command value map is stored in a memory (not illustrated) in control unit 150. Accordingly, in the electrically powered vehicle according to the present embodiment, system voltage VH is variably controlled, in order to smoothly and efficiently drive motor generator 30. That is, a voltage amplitude (pulse voltage amplitude) applied to motor generator 30 is variably controlled depending on the operating state of motor generator 30 (rotational speed and torque).

Control unit 150 reads battery information based on the detection values from battery sensors 115, 125 shown in FIG. 1. The battery information contains at least battery voltage Vb2.

At step S120, control unit 150 compares battery voltage Vb2 with voltage command value VHr set at step S100. When Vb2>VHr (when it is determined as YES at S120), control unit 150 proceeds to the processing at step S130, where relays RL1, RL2 are turned on. Battery 120 is thus connected to power line PL1.

Converter 130 controls charge or discharge of battery 110 such that system voltage VH matches voltage command value VHr. Batteries 110, 120 can thus be used in parallel, allowing control of charge/discharge from/to load 10. When electrically powered vehicle 5 is regeneratively braked in this state, batteries 110, 120 can be charged in parallel.

On the other hand, when Vb2<VHr (when it is determined as NO at S120), control unit 150 proceeds to the processing at step S140, where relays RL1, RL2 are turned off. Battery 120 is thus disconnected from power line PL1. As described above, since VHr VHmin, relay RL1 is reliably turned off based on the determination at step S120, at least when Vb2<VHmin.

In this case, charge/discharge from/to load 10 is controlled using only battery 110 via converter 130. When electrically powered vehicle 5 is regeneratively braked in this state, only battery 110 is charged.

Accordingly, in the electrically powered vehicle according to the present embodiment, even though the power supply system including the plurality of batteries 110, 120 is configured such that a converter is provided only for battery 110, variable control of system voltage VH in accordance with an operating state of motor generator 30 can be achieved. Consequently, a power supply system capable of improving the travel distance by using output of motor generator 30 using power from the plurality of power storage devices (batteries 110, 120) can be configured simply and efficiently.

In particular, a high-voltage region of system voltage VH for handling acceleration of the vehicle and the like can be attained by disconnecting battery 120, whose output voltage is lower than the voltage command value (minimum required voltage), from power line PL1, and boosting the output voltage of battery 110 with converter 130. Further, when the output voltage of battery 120 is higher than the voltage command value (minimum required voltage) and thus, battery 120 can be used, batteries 110, 120 can be used in parallel. Accordingly, the plurality of power storage devices (batteries 110, 120) can be effectively used to supply power for traveling by using output of motor generator 30, thus enabling the power supply system to be smaller and configured efficiently at low cost.

It is noted that in the case of using battery 120, if a voltage difference $\Delta V$ between voltage command value VHr and battery voltage Vb2 ($\Delta V$=Vb2 VHr) is great, the limit of control performed by converter 130 may be exceeded, causing system voltage VH to be excessively high. In consideration of such a risk, it is also possible to apply control processing shown in FIG. 4.

Figures 4, 5:
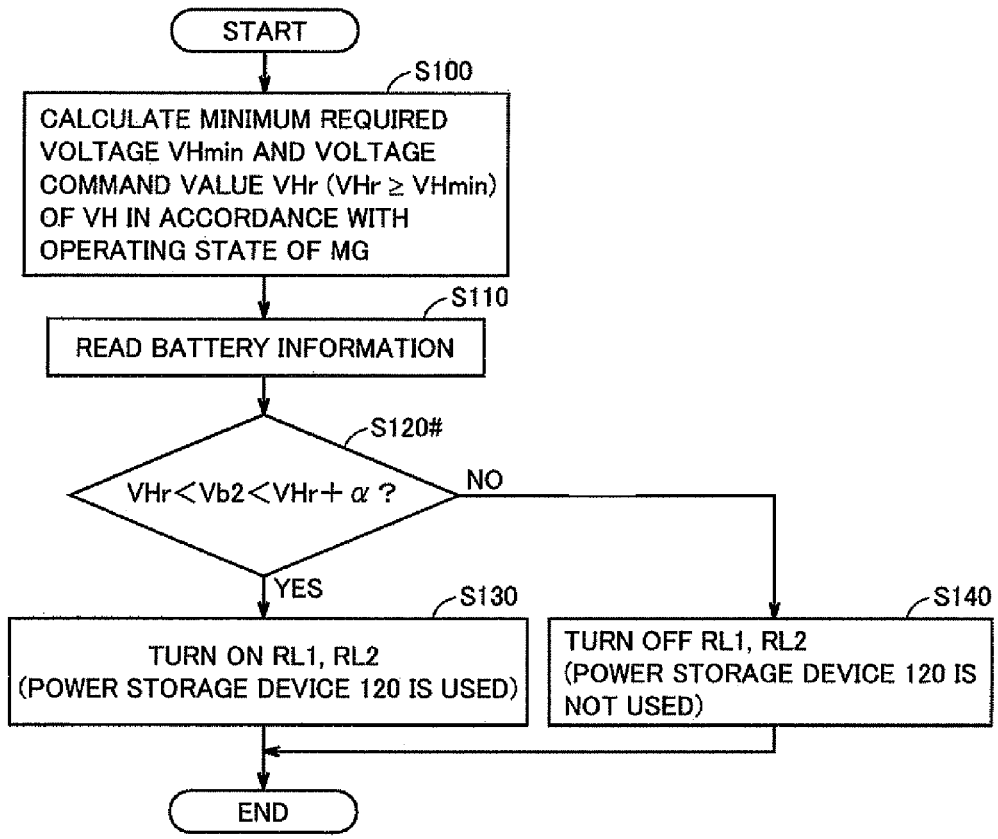
FIG. 4 is a flowchart for explaining a second example of control processing in the power supply system of the electrically powered vehicle according to the embodiment of the present invention.
FIG. 5 is a table showing charge and discharge power upper limit values for the power supply system of the electrically powered vehicle according to the embodiment of the present invention.

FIG. 4 is a flowchart for explaining a second example of control processing in the power supply system of the electrically powered vehicle according to the embodiment of the present invention.

When FIG. 4 is compared with FIG. 3, in the second example of control processing, control unit 150 executes step S120# instead of step S120 shown in FIG. 3.

At step S120#, control unit 150 determines whether the difference between voltage command value VHr and battery voltage Vb2 is within a certain range or not. Specifically, it is determined whether battery voltage Vb2V is within a range of VHr<Vb2<VHr+$\alpha$, where $\alpha$ is a predetermined threshold value.

Then, when VHr<Vb2<VHr+$\alpha$(when it is determined as YES at S120#), control unit 150 proceeds to the processing at step S130, where battery 120 is connected to power line PL1. On the other hand, when Vb2<VHr or Vb2>VHr+(when it is determined as NO at S120#), control unit 150 proceeds to the processing at step S130, where battery 120 is disconnected from power line PL1.

In this way, system voltage VH can be prevented from becoming excessively high, in addition to the above-described effects achieved for the electrically powered vehicle according to the present embodiment.

(Restriction on Charge/Discharge in Power Supply System)

In the power supply system of the electrically powered vehicle, a range of power with which power supply system 100 can be charged from load 10 and a range of power that can be discharged to load 10 from power supply system 100 are set. Generally, the output (torque) of motor generator 30 is then restricted such that charge/discharge power falls within the set range of power. The range of power that can be charged or discharged is defined by a charge power upper limit value Win or a discharge power upper limit value Wout. Both Win and Wout hereinafter represent the magnitudes (absolute values) of power charged and discharged.

In the power supply system of the electrically powered vehicle according to the present embodiment, a first mode in which battery 120 is used or a second mode in which battery 120 is not used is selected. With respect to each of the first and second modes, control unit 150 sets Win and Wout in the entire power supply system based on a charge power upper limit value Win1 and a discharge power upper limit value Wout1 for battery 110 alone, as well as based on a charge power upper limit value Win2 and a discharge power upper limit value Wout2 for battery 120 alone, as follows.

Control unit 150 calculates Win1 and Wout1 for battery 110, based on battery current Ib1, battery voltage Vb1, and battery temperature Tb1. Similarly, control unit 150 calculates Win2 and Wout2 for battery 120, based on battery current Ib2, battery voltage Vb2, and battery temperature Tb2. Since any known technique can be applied to the calculation of Win and Wout for each battery, detailed description thereof is not provided herein.

Referring to FIG. 5, in the first mode in which battery 120 is used, batteries 110, 120 are connected in parallel with load 10. Therefore, control unit 150 finds discharge power upper limit value Wout in the entire power supply system 100 in accordance with equation (1) below. Charge power upper limit value Win is found in accordance with equation (2) below.

$$Wout = Wout1(L1+Lc) + Wout2-L2 \quad (1)$$

$$Win = Win1(L1+Lc) + Win2+L2 \quad (2)$$

In each of equations (1) and (2), L2 represents loss produced on a path for supplying power between battery 120 and power line PL1, and includes loss on a power cable, loss due to relay RL1, and the like. Similarly, L1 represents loss produced on a path for supplying power between battery 110 and power line PL1. Lc represents power loss produced in converter 130.

These loss terms L1, L2, and Lc can be determined in advance based on experimental results and the like. L1, L2, and Lc may be constants (fixed values) or variables that vary in accordance with parameters such as current and the like.

On the other hand, in the second mode in which battery 120 is not used, battery 110 alone is connected with load 10. Therefore, control unit 150 finds discharge power upper limit value Wout in the entire power supply system 100 in accordance with equation (3) below. Charge power upper limit value Win is found in accordance with equation (4) below.

$$Wout = Wout1(L1+Lc) \quad (3)$$

$$Win = Win1+(L1+Lc) \quad (4)$$

Accordingly, the range of power that can be charged/discharged in the entire power supply system 100 can be set precisely, by reflecting the difference in the loss on the path for supplying power and the loss due to converter 130, in accordance with switching between use and non-use of battery 110. This enables charge/discharge by using each of batteries 110, 120 to its full capacity, thus allowing power of batteries 110, 120 to be efficiently used.

(Modification of Control Processing)

Figure 6:
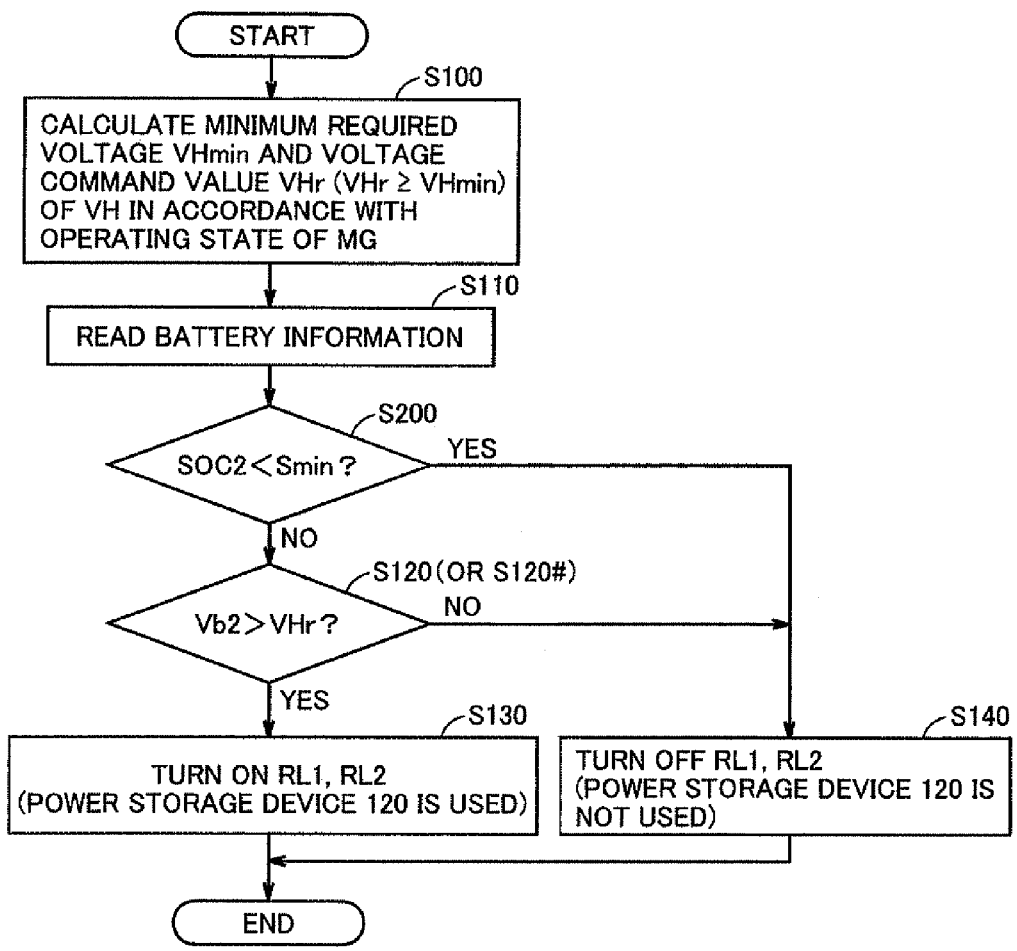
FIG. 6 is a flowchart for explaining a modification of control processing in the power supply system of the electrically powered vehicle according to the embodiment of the present invention.

FIG. 6 is a flowchart for explaining a modification of control processing in the power supply system of the electrically powered vehicle according to the embodiment of the present invention.

Referring to FIG. 6, in the control processing according to the modification, as compared to the flowchart shown in FIG. 3 or 4, control unit 150 further executes step S200. Moreover, battery information read at step S110 contains, in addition to battery voltage Vb2, an SOC (State of Charge) of battery 120. The SOC of battery 120 will hereinafter be denoted as SOC2.

As is well known, SOC shows a ratio in percentage of the presently remaining capacity of a battery with respect to its full charge capacity. Various techniques have been proposed for calculating SOC based on battery current, voltage, and the like. Control unit 150 can acquire the SOC of battery 120 by using any of these known techniques, as appropriate.

At step S200, control unit 150 compares SOC2 with a threshold value Smin. Threshold value Smin is set based on a boundary value of an SOC region at which battery 120 undergoes deterioration due to overdischarge.

When SOC2<Smin (when it is determined as YES at step S200), control unit 150 proceeds to the processing at step S140, where relays RL1, RL2 are turned off. Battery 120 is thus disconnected from power line PL1 and is not used.

When batteries 110, 120 are being used in parallel, charged/discharged power of battery 120 is determined along with charge/discharge control of battery 110 by converter 130. Thus, if the SOC of battery 120 becomes lower than expected due to an error in the control performed by converter 130, there is a risk of deterioration due to overdischarge. Therefore, in such an SOC region, battery 120 is preferably disconnected from power line PL1, irrespective of the operating state (i.e., voltage command value VHr) of motor generator 30. Battery 120 can thus be protected from overdischarge.

On the other hand, when SOC2>Smin (when it is determined as NO at step S200), control unit 150 controls the use and non-use of battery 110 in accordance with the processing from step S120 (or S120#) to S140, as in FIG. 3 or 4.

According to this modification, battery 120 can be protected from overdischarge in the power supply system of the electrically powered vehicle according to the present invention.

(Example of Application of the Plurality of Power Storage Devices)

The power supply system of the electrically powered vehicle according to the present embodiment includes the plurality of power storage devices (batteries 110, 120). It is understood that the control processing of the power supply system described above can also be applied to a plurality of power storage devices having common output characteristics and output voltage. In the present embodiment, however, an asymmetrical configuration in which converter 130 is disposed only for one of the power storage devices (battery 110) is provided. In consideration of this, by making the output characteristics and/or output voltages of the plurality of power storage devices (batteries 110, 120) different from each other, the power supply system can be designed more efficiently.

First, with respect to the output voltage of each power storage device, the rated value of the output voltage of battery 110 provided with converter 130 can be set to be lower than that of battery 120, as described above. In this way, the number of battery cells connected in series in battery 110 can be reduced. Similarly, the number of battery cells connected in series in battery 120 can be reduced by appropriately designing the rated value of the output voltage of battery 120 in a range lower than upper limit voltage Vmax of system voltage VH.

Figure 7:
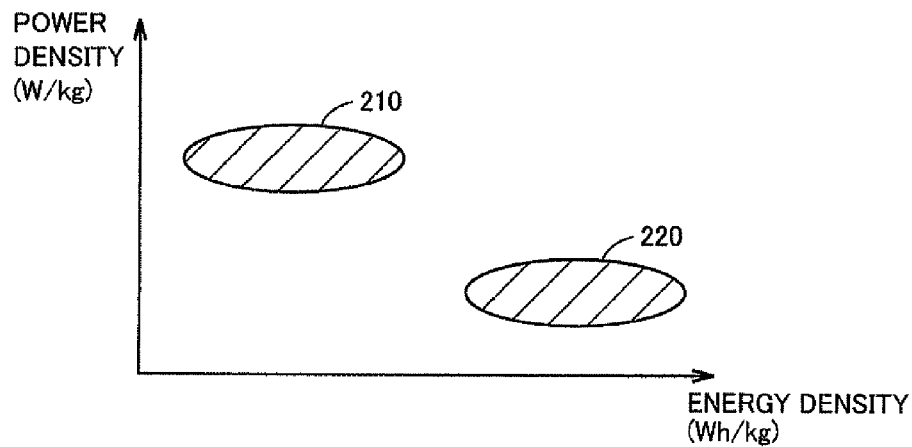
FIG. 7 is a conceptual diagram for explaining characteristics of power storage devices in the power supply system of the electrically powered vehicle according to the embodiment of the present invention.

FIG. 7 shows a. Ragone plot for explaining the output characteristics of each of the power storage devices.

Referring to FIG. 7, the vertical axis shows the power density (W/Kg) of a power storage device, and the horizontal axis shows the energy density (Wh/Kg) of the power storage device. In a situation where application to an on-board power storage device for an electrically powered vehicle is considered, a power storage device with a high power density is advantageous for a request for high torque output in a short period, such as a request for acceleration. On the other hand, in order to lengthen the travel distance during normal traveling, a power storage device with a high energy density is advantageous.

The energy density and power density differ depending on the type of power storage device (battery/capacitor) or the type of battery (nickel-metal hydride battery/lithium-ion secondary battery). Alternatively, even in the case of the same type of power storage devices, the energy density and power density of each power storage device can be changed with a design.

For example, the output characteristics of a secondary battery change depending on a thickness upon application of an active material to a base material. By way of example, when the active material is thinly and widely applied, the amount of the active material that contributes to reaction per unit time increases, thus achieving a battery with a relatively high power density. Conversely, when the active material is thickly applied, the power density relatively decreases while the energy density can be increased.

In the power supply system of the electrically powered vehicle according to the present embodiment, battery 120 is not used when high power is required for motor generator 30, owing to acceleration or high-speed traveling of electrically powered vehicle 5 (i.e., when voltage command value VHr is high). Therefore, battery 120 is used in a region where the output power of motor generator 30 is relatively low. For this reason, a high-energy type power storage device with a high energy density and a low power density, such as that shown 1 in a region 220 in FIG. 7, is preferably applied to battery 120. In the case of a hybrid vehicle, this achieves increased travel distance of so-called EV (Electric Vehicle) traveling using motor generator 30 alone. In the case of an electric vehicle, an extended range is achieved.

On the other hand, battery 110 needs to handle supply of power in a situation where motor generator 30 outputs high power. Therefore, a power storage device with a high power 1 density and a low energy density, such as that shown in a region 210 in FIG. 7, is preferably used for battery 110.

Accordingly, it is preferable to use power storage devices, depending on the characteristics as shown in regions 210 and 220 in FIG. 7, for batteries 110 and 120, respectively. In this way, a request for high output from a user (acceleration or high-speed traveling) can be handled, and moreover, the power supply system can be configured efficiently so as to lengthen the travel distance by using output of motor generator 30.

It is noted that the configuration of load 10 (i.e., the drive system) of electrically powered vehicle 5 shown in FIG. 1 is not limited to that illustrated herein. That is, as described above, the present invention is commonly applicable to an electrically powered vehicle mounted with a motor for traveling, such as an electric vehicle, a hybrid vehicle, a fuel cell vehicle, or the like. Further, the number of motors for traveling is not particularly limited, either.

Moreover, although a non-insulating type chopper circuit is exemplified as converter 130 in the present embodiment, any circuit configuration can be applied as long as DC voltage conversion between battery (power storage device) 110 and power line PL1 can be performed in the same manner.

It should be understood that the embodiments disclosed herein are illustrative and non-restrictive in every respect. The scope of the present invention is defined by the terms of the claims, rather than by the foregoing description, and is intended to include any modifications within the scope and meaning equivalent to the terms of the claims.

INDUSTRIAL APPLICABILITY

The present invention is applicable to an electrically powered vehicle mounted with a plurality of power storage devices.

REFERENCE SIGNS LIST

5: electrically powered vehicle, 10: load, 20: inverter, 30: motor generator, 40: power transmission gear, 50: driving wheel, 100: power supply system, 110, 120: battery (power storage device), 115, 125: battery sensor, 120: power storage device, 120: battery, 130: converter, 140: smoothing capacitor, 150: control unit, 200: maximum output line, 205: voltage sensor, D1, D2: anti-parallel diode, GL, PL1, PL2: power line, Ib1, Ib2: battery current, L: reactor, L1, L2, Lc: loss term, N1: node, P1, P2: operating point, Q1, Q2: power semiconductor switching element, RL1, RL2: relay, SMR1, SMR2: system main relay, Smin: threshold value (SOC), Tb1, Tb2: battery temperature, VH: DC voltage (system voltage), VHmin: minimum required voltage, VHr: voltage command value, Vb1, Vb2V: battery voltage, Win, Win1, Win2: charge power upper limit value, Wout, Wout1, Wout2: discharge power upper limit value.

The invention claimed is:

1. An electrically powered vehicle comprising:
a motor for generating vehicle driving force;
a first power storage device;
a second power storage device;
a first power line for transmitting power inputted to and outputted from said motor;
a second power line connected to said first power storage device;
a converter for carrying out bidirectional DC voltage conversion between said first power line and said first power storage device through said second power line;
a first pair of switches connected to said first power line;
a second pair of switches connected to said second power line;

a switch of said first pair of switches connected between said second power storage device and said first power line; and a control unit for controlling said switch to be turned on or off in accordance with an operating state of said motor.

2. The electrically powered vehicle according to claim 1, wherein
said control unit calculates a minimum required voltage of said first power line in accordance with a torque and a rotation speed of said motor, and turns off said switch when an output voltage of said second power storage device is lower than said minimum required voltage.

3. The electrically powered vehicle according to claim 2, wherein
said control unit sets a voltage command value of said first power line in a range not lower than said minimum required voltage in accordance with the torque and the rotation speed of said motor, and turns on said switch when the output voltage of said second power storage device is higher than said voltage command value, while it turns off said switch when said output voltage is lower than said voltage command value.

4. The electrically powered vehicle according to claim 3, wherein
said control unit turns off said switch when a voltage difference obtained by subtracting said voltage command value from the output voltage of said second power storage device is greater than a predetermined threshold value.

5. The electrically powered vehicle according to claim 1, wherein
said control unit turns off said switch when a charge level of said second power storage device becomes lower than a predetermined value.

6. The electrically powered vehicle according to claim 1, wherein
said control unit sets, when said switch is turned off, charge and discharge power upper limit values in entire said first and second power storage devices, based on charge and discharge power upper limit values of said first power storage device and a loss power value in said converter, and sets, when said switch is turned on, the charge and discharge power upper limit values in entire said first and second power storage devices, based on the charge and discharge power upper limit values of said first power storage device, charge and discharge power upper limit values of said second power storage device, and the loss power value in said converter.

7. The electrically powered vehicle according to claim 1, wherein
a rated value of an output voltage of said first power storage device is lower than a rated value of the output voltage of said second power storage device.

8. The electrically powered vehicle according to claim 1, wherein
said first power storage device has a power density higher than that of said second power storage device, and
said first power storage device has an energy density lower than that of said second power storage device.

9. A method for controlling an electrically powered vehicle mounted with a motor for generating vehicle driving force,
a first power storage device,
a second power storage device,
a first power line for transmitting power inputted to and outputted from said motor;
a second power line connected to said first storage device
a converter for carrying out bidirectional DC voltage conversion between said first power line and said first power storage device through the second power line,
a first pair of switches connected to said first power line, and a second pair of switches connected to said second power line, the method comprising the steps of:
detecting an output voltage of said second power storage device; and
controlling a switch of the first pair of switches connected between said second power storage device and said first power line to be turned on or off in accordance with an operating state of said motor.

10. The method for controlling an electrically powered vehicle according to claim 9, further comprising the step of:
calculating a minimum required voltage of said first power line in accordance with a torque and a rotation speed of said motor, wherein
in said step of controlling, said switch is turned off when the output voltage of said second power storage device is lower than said minimum required voltage.

11. The method for controlling an electrically powered vehicle according to claim 10, wherein
in said step of calculating, a voltage command value of said first power line is set in a range not lower than said minimum required voltage in accordance with the torque and the rotation speed of said motor, and
in said step of controlling, said switch is turned on when the output voltage of said second power storage device is higher than said voltage command value, while said switch is turned off when said output voltage is lower than said voltage command value.

12. The method for controlling an electrically powered vehicle according to claim 11, wherein
in said step of controlling, said switch is turned off when a voltage difference obtained by subtracting said voltage command value from the output voltage of said second power storage device is greater than a predetermined threshold value.

13. The method for controlling an electrically powered vehicle according to claim 9, further comprising the step of turning off said switch when a charge level of said second power storage device becomes lower than a predetermined value.

* * * * *